(12) United States Patent
Williamson et al.

(10) Patent No.: US 6,238,183 B1
(45) Date of Patent: May 29, 2001

(54) COOLING SYSTEMS FOR GAS TURBINE ENGINE AIRFOIL

(75) Inventors: Robert P E Williamson, Dursley; Kevin P Self; Martin A J Emery, both of Bristol, all of (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/334,933

(22) Filed: Jun. 17, 1999

(30) Foreign Application Priority Data

Jun. 19, 1998 (GB) ................................................. 9813251
May 27, 1999 (GB) ................................................. 9912956

(51) Int. Cl.$^7$ ....................................................... F01D 5/18
(52) U.S. Cl. ............................................................ 416/96 A
(58) Field of Search ..................................... 415/115, 116, 415/121.2; 416/96 R, 96 A, 97 R, 97 A

(56) References Cited

U.S. PATENT DOCUMENTS

| 4,042,162 | * | 8/1977 | Meginnis et al. | ................... | 416/97 A |
| 4,347,037 |   | 8/1982 | Corrigan . |   |   |
| 4,565,490 | * | 1/1986 | Rice | ................... | 416/96 A |
| 5,688,104 | * | 11/1997 | Beabout | .............................. | 416/97 R |

FOREIGN PATENT DOCUMENTS

| 340 149 | | 11/1989 | (EP) . | |
| 1033759 | * | 6/1966 | (GB) | .................................. 416/97 R |
| 1 285 369 | | 8/1972 | (GB) . | |
| 1285369 | * | 8/1972 | (GB) . | |
| 2 017 229 | | 10/1979 | (GB) . | |
| 1 605 194 | | 4/1983 | (GB) . | |
| 2 127 105 | | 4/1984 | (GB) . | |
| 2 246 174 | | 1/1992 | (GB) . | |

* cited by examiner

Primary Examiner—Edward K. Look
Assistant Examiner—James M McAleenan
(74) Attorney, Agent, or Firm—Oliff & Berridge, PLC

(57) ABSTRACT

Means for reducing blockage of cooling apertures in a hollow gas turbine guide vane by sand or other particles entrained in cooling air, is provided by a partition within the vane for dividing the hollow region into first and second regions, the first region having a flow of high pressure cooling air, the second region being at a pressure lower than the first region. The partition is provided with a channel on the high pressure side. Apertures are located in the base of the channel providing flow between the first and second regions and directing cooling air at the inside surface of the vane. The inlet area of the channel is greater than the total cross-section area of the apertures, and the width of the channel distal to its base is less than or equal to the diameter of the apertures, thus trapping in the channel entrained particles larger than the diameter of the apertures.

12 Claims, 2 Drawing Sheets

COOLING SYSTEMS FOR GAS TURBINE ENGINE AIRFOIL

This invention relates to improvements to gas turbine engine airfoils.

In particular, the invention concerns improvements to an internal air cooling system for a gas turbine engine airfoil and especially a nozzle guide vane by providing means to reduce the effect of blockages in certain critical passages in the cooling system, more particularly narrow cooling holes in an impingement and film cooling system, due to trapped particulate material entrained in the cooling air.

In an impingement cooling system it is typical for the cooling air having passed through several passages to enter a plenum from which at least a proportion exits via a number of narrow diameter holes to provide impingement cooling jets onto another part of wall. In the event one of these holes becomes blocked, for example by air borne particles trapped in the hole itself, the associated cooling jet is lost to the detriment of overall cooling efficiency. Deterioration is progressive until eventually the airfoil suffers damage due to the overheating.

In the case where the impingement cooling jets subsequently feed airfoil film cooling systems, blockage of the impingement holes will reduce film cooling flows. Furthermore, any particles which pass through the impingement plate holes may subsequently block the film cooling holes leading to severe overheating and rapid deterioration of the airfoil leading edge.

It is accordingly an objective of the present invention in its most general form to provide a means for trapping particulate material entrained in a fluid.

It is a further objective of the present invention to provide a means for reducing blockage of cooling holes in an airfoil or guide vane of a gas turbine engine.

According to one aspect of the present invention there is provided a gas turbine engine airfoil having an internal air system including air delivery impingement holes 48 having a certain predetermined width, wherein, in use, the air system may carry particles of sufficiently large size to block the air delivery impingement holes 48, the airfoil including a partition member through which the internal air passes via at least one hole comprising an impingement hole exit aperture 52 of said predetermined width in the downstream surface of the partition member, and a non-circular impingement hole entry aperture 54 formed in the upstream surface of the partition member which has a minor dimension less than or equal to the impingement hole exit aperture 52 width whereby to exclude particles of greater size and a substantially larger major dimension such that the passage of air into the hole is largely unaffected by particles which become trapped in the impingement hole entry aperture 54.

According to another aspect of the invention each air delivery impingement hole is supplied through an individual non-circular impingement hole entry aperture 54 having said major and minor dimensions.

According to a further aspect of the invention each air delivery impingement hole 48 is supplied from the base of a passageway or channel formed in the upstream side of the partition member and the minor dimension constituting the width of the channel is less than the width of the air delivery impingement hole 48.

According to a still further aspect of the present invention there is provided a means for reducing blockage of film cooling apertures 48 in a guide vane of a gas turbine engine by particulate material entrained in high-pressure cooling air directed within the vane, the vane being a hollow body externally of airfoil form, there being provided a partition within the vane for dividing the hollow region into first and second regions, the first region being adapted to receive high pressure cooling air, the second region being adapted to be at a pressure lower than that of the first region, the partition being provided with a plurality of apertures providing flow communication between the first and second regions and arranged to direct cooling air towards the inside of the guide vane, wherein the partition is provided with a channel on the high pressure side, said plurality of apertures being located in the base of the channel, the inlet area of the channel being greater than the total cross-section area of the apertures, and the width of the channel distal to its base being less than or equal to the minimum diameter of any one of said apertures, whereby an entrained particle that is larger than the diameter of the apertures is trapped by the channel.

The invention will now be described by way of example only with reference to the accompanying drawings, in which, FIG. 1 consisting of a section through a known nozzle guide vane in a plane at right angles to its span, shows a vane susceptible to blockage by air borne particles in the internal air cooling system;

Figure 1:
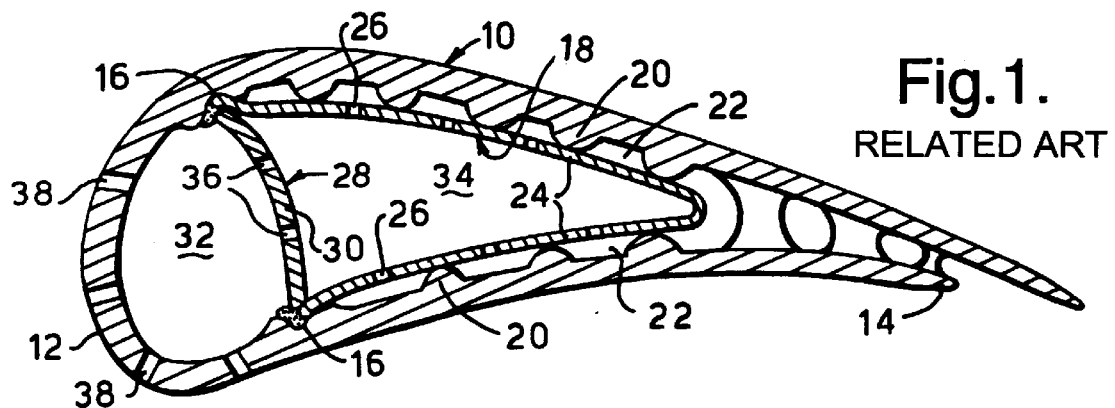
Figure 2:
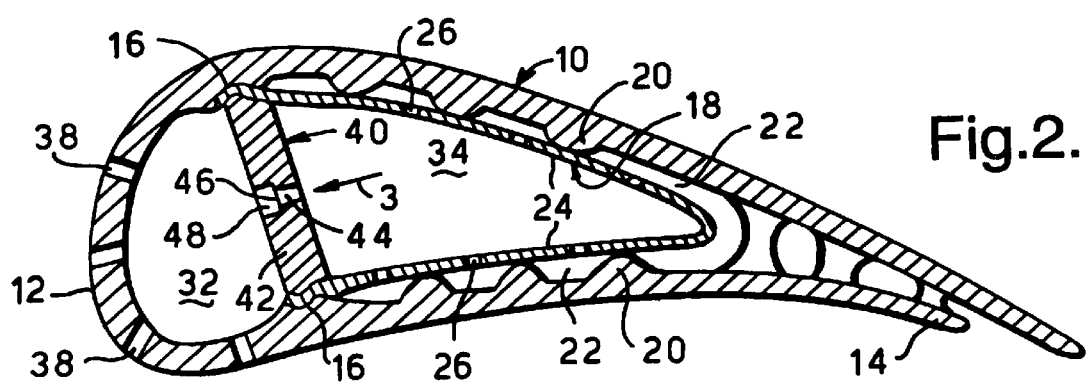
FIG. 2 shows a section through a nozzle guide vane in a plane at right angles to its span, including an apertured partition incorporating the invention.

FIG. 1 shows a section through a nozzle guide vane, at right angles to its span, which forms part of an internal air cooling system. Air trapped from a compressor section (not shown) is ducted through various parts of the cooling system to perform a cooling function. In the interior of the vane the cooling air supply is used to produce a number of impingement cooling jets for the leading edge of the vane and to supply cooling air to surface film cooling apertures.

The nozzle guide vane of FIG. 1 comprises a cast, airfoil shaped hollow body 10, having a leading edge 42 and a trailing edge 14 and extends across the engine gas path in a radial direction. The body 10 has an inner surface which in this particular example is generally the same shape as its external form. The inner surface is provided with a number of internal surface features including inwardly facing grooves 16 on opposite sides of the vane. The grooves 16 lie intermediate the leading edge 12 and the trailing edge 14, and extend lengthwise of the vane in a radial direction. A first metal insert 18, which essentially consists of a plate of generally U-shaped or V-shaped cross-section and extends the radial height of the vane, is located in the interior of the vane. The edges at the distal ends of the limbs of the V or U by are engaged with the grooves 16 for location. The side panels 24 of the insert 18 contact small inwardly facing projections 20 on the inner surface of the vane 10 to form air passages 22 between the insert 18 and the inner surface of the vane. The insert 18 comprises a single member having two panels 24 extending over the full spanwise length of the vane 10 which converge towards the trailing edge 14 and are in sealing engagement with the interior surface of the vane 10 at the grooves 16. Each panel 24 is provided with apertures 26 providing flow communication between a plenum region 34 bounded by the panels and the air passages 22. The air passages 22 communicate with the trailing edge 14 where they exit to ambient atmosphere.

The vane 10 is further provided with a second sheet metal insert or partition member 28 comprising a panel 30 extending across the vane 10 between the groove 16, the spanwise extending edges of which are in sealing engagement with the inside surfaces of the crimped portions of the first insert engaged with the grooves 16. Panel 30 also extends the full spanwise length of the vane 10. The panel 30 hence partitions the internal volume of the vane 10 into a leading edge plenum region 32 and a trailing edge plenum region 34. The leading edge 12 of the vane 10 is also provided with film cooling apertures 38 providing external surface cooling flow by exhausting air from the leading edge plenum region 32. The panel 30 is provided with plenum apertures 36 which provide flow communication between the two plenum regions 32, 34. The total area of plenum apertures 36 meters flow to surface cooling apertures 38 and individual apertures effectively create impingement cooling jets directed at the inside of the leading edge 12. Panel 30 is therefore referred to as an "impingement plate".

A further panel (not shown) may be provided at the radially inner end of the vane 10 to close the otherwise open ends of the plenum region 32, 24 at least between the panels 34. The radially outer end of the vane is open to a source of pressurized cooling air. Hence, cooling air under pressure entering the trailing edge plenum region 34 from the open spanwise end (ie the air entering in a direction at right angles to the plane of FIG. 1) will exit via the apertures 26 in panel 24 into passages 22, and via plenum apertures 36 in panel 30 into the leading edge plenum region 32, and thence into the gas path via film cooling apertures 38 in the leading edge 12.

Although described with reference to nozzle guide vanes an essentially similar arrangement could be used for internally cooled rotative blades, in which case the source of cooling air is invariably via the blade root section thereby making use of centrifugal effects. However, in the case of guide vanes it is possible to source the cooling air from a radially outward supply, flowing inwards so that the end plates may need to be located at the inner end of the vane.

Another similar, but older, cooling system for a hollow nozzle guide vane for an aircraft gas turbine engine is described in British Patent 2,017,229 B (Rolls-Royce Ltd). However, in this system the partitioning panel between the leading and trailing edge plenum regions has no apertures or perforations to act as an impingement plate, or provide flow communication.

The cooling systems for nozzle guide vanes as described above are efficient when the pressurised cooling air is clean, as for instance, in a gas turbine engine in an aircraft flying at altitude. However, there can be situations, such as an aircraft flying at low level or hovering at or near ground level, where particles (eg sand from the ground) may be entrained in the pressurised cooling air supply. This is especially so in sandy desert conditions. The entrained particulate material, above a certain grain size, may block the plenum apertures 36 in the impingement panel or plate 30 leading from the trailing edge plenum region 34. This is particularly disadvantageous because, in order to minimise any detriment to the engine cycle, the number of cooling holes in the impingement plate 30 is set to the minimum necessary to cool the vane leading edge 12 and to supply the film cooling apertures 38. Thus the inevitable result of any blockage is an unacceptable reduction of cooling air to the inside of the leading edge 12 of the nozzle guide vane and the film cooling apertures 38. Furthermore, any entrained particulate material which passes through the plenum apertures 36 may subsequently block the film cooling apertures 38 leading to overheating of the vane leading edge 12.

Referring to FIGS. 2–5, where parts corresponding to similar parts in FIG. 1 carry like references, there is provided, instead of the partition member 28 of FIG. 1, an improved partition member 42 or impingement plate 40 according to the invention. The partition member 42 may pass all of the cooling system flow or a part of it.

Impingement plate 40 comprises a member 42 extending across the width of the plenum 34 between, and in sealing engagement with, the panel edges in grooves 16. Partition member 42 also extends the full spanwise length of the vane 10. The partition member 42 divides the internal space of the vane into leading edge plenum region 32 and trailing edge plenum region 34, similar to the plate 30 described with reference to FIG. 1 above. This member 42 may be in the form of a strip or bar, or possibly made of sheet material, normally of a metal or metal alloy.

Partition 42 is provided, on the side facing into the trailing edge plenum region 34, with a passageway or channel 44 extending substantially the spanwise length of the panel. A plurality of impingement holes 48 are formed in the base 46 of the radially extending channel 44 through the member 42 into the leading edge plenum region 32. Hence, high pressure cooling air in plenum 34 will, subject to correct pressure differential, pass through holes 48 constituting cooling jets which impinge upon, and cool, the leading edge 12 and supply the surface cooling apertures 38. As in the prior art vane of FIG. 1, the leading edge 12 is provided with film cooling exit apertures 38 whereby cooling air is allowed to flow over the external surface of the vane.

The channel 44 of total length "c" is designed, according to the invention, so that the inlet area of the channel is greater than the total inlet area of the air delivery impingement holes 48. Furthermore, the distance between parallel upper edges of the channel sides, the width of the channel ("a" in FIG. 3) at its inlet (ie the part remotest from the air delivery impingement holes 48) is less than or equal to the minimum inlet diameter ("b" in FIG. 3) of any of the air delivery impingement holes 48. Hence, as shown in FIGS. 2–5, the channel walls 44 diverge towards the channel base 46. The length "c" (FIG. 3) of the channel 44 is relatively unimportant, at least as far as concerns prevention of direct blockage of the air delivery impingement holes 48. Obviously the total inlet area of the channel shall be sufficient to avoid choking of the holes up to a predetermined level of blocking by trapped particles.

Figure 5:
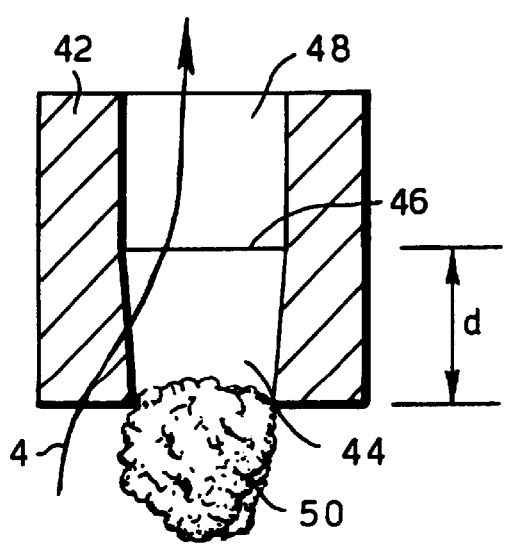
FIG. 5 shows an enlarged section through the partition of FIG. 3 taken along line V—V.

In another embodiment (not shown) the walls of the channel 44 are parallel, but the distance between the walls is no greater than the diameter of any air delivery impingement hole 48. In another version the difference between the impingement hole diameter and the channel width may be accommodated by a step change at the base 46 or by a ramp within the air delivery length of impingement hole 48. As shown in FIG. 5, the depth "d" of the channel 44 is sufficient to allow air to pass around any trapped particle 50 (arrow 4) into the air delivery impingement hole 48. Thus in the described, and illustrated, embodiment only the air passing through the partition member 42 into the leading edge plenum is effectively filtered by the channeled impingement plate. In effect only this branch of the internal cooling is filtered in this way, but if desired the plate 40 could be positioned elsewhere to pass and thus effectively filter the whole of the internal cooling system flow. Thus, in respect of a whole array of holes:

$$a.c \geq k.n.\pi(^b/_2)^2$$

where k is some constant and n is the number of holes.

In use, particulate material entrained in the cooling air, eg sand particles, over a certain size equal to or larger than the width of the inlet portion of the channel 44, as illustrated in FIG. 5, will be trapped between the edges of the channel. Although these trapped particles create a blockage in that they reduce the entry or inlet area of the channel the particles are trapped clear of the entry orifices of the air delivery impingement holes 48 or film cooling apertures 38 and they do not directly block the holes. The flow of cooling air to all the impingement and film cooling holes is therefore maintained for a considerably longer period compared to the prior arrangements. The trapped particles will progressively block the channel entry but all the while the impingement and film cooling holes themselves will remain clear and operative. Eventually as the channel entry area is reduced there will be a progressive reduction in pressure within the channel and the cooling flow may becomes partially choked but normal cooling function will have maintained for substantially longer than is the case with the prior art arrangement. Thus not only is impingement cooling of the interior of the vane, or blade, prolonged but the external filming cooling also benefits. Smaller particles, of course, will pass straight through the channel 44 and the air delivery impingement holes 48 to exit through film cooling apertures 38 in the leading edge 12.

Conveniently the partition member 42 may be designed to be readily removable from the grooves 16 or its engagement with the shaped insert 18 so as to allow removal of accumulated particulate material at overhaul. This may be done by arranging for the partition member 42 to be a sliding insert into the grooves 16 of the corresponding portions of the insert 18 so that the partition members 42 may be slid out when required.

Figure 6:
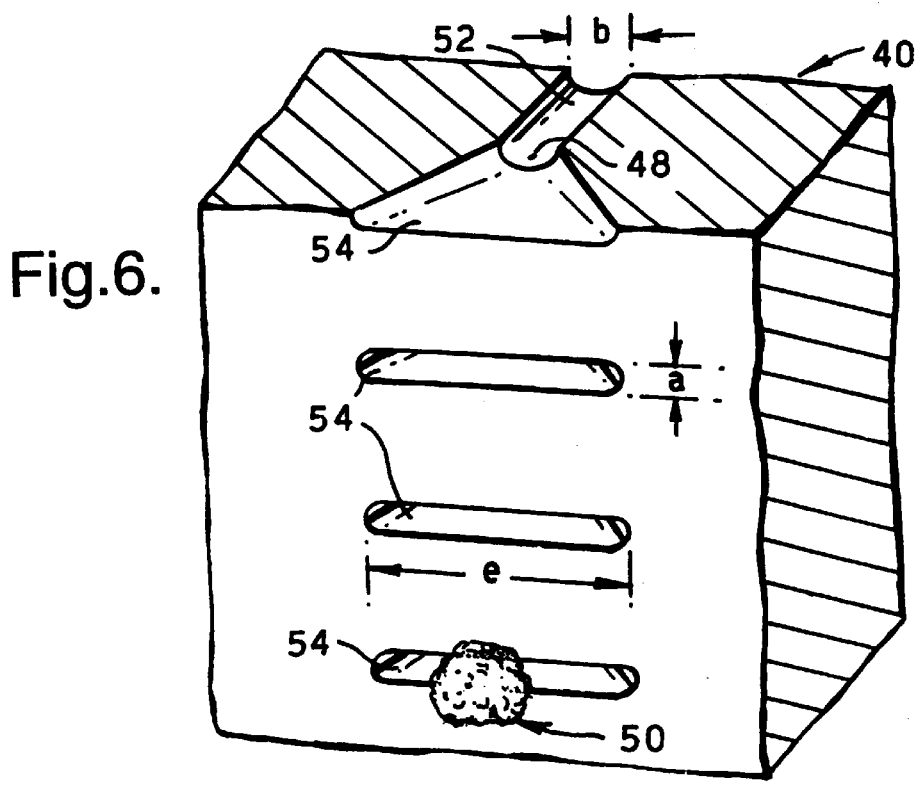
FIG. 6 shows a perspective view of another air delivery impingement hole 48 arrangement in which the holes are supplied individually.
Figure 3:
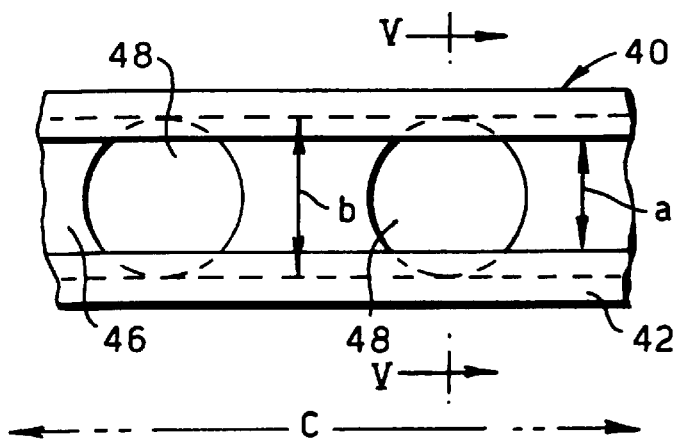
FIG. 3 shows a view of the apertured partition in FIG. 2 taken in the direction of arrow 3.
Figure 4:
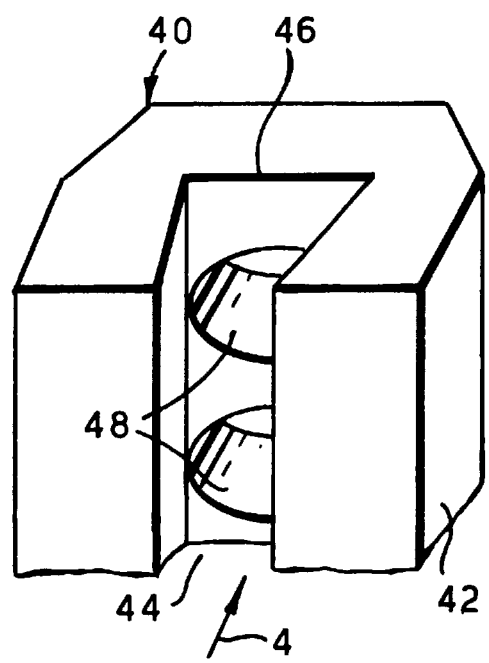
FIG. 4 shows a perspective view of a portion of the apertured partition of FIG. 3.

Turning now to FIG. 6 the same principle is applied to individual holes, rather than to a group of adjacent holes as illustrated in FIGS. 3 to 5 inclusive. Maintaining the same convention and references, where applicable, as previously adopted: a plurality of air delivery impingement holes 48 of dimension "b" are formed through a partition member 42, the holes are spaced apart in a linear array in the drawing but could be arranged in two-dimensional arrays or even individually. Each of the air delivery holes 48 is formed with an impingement hole exit aperture 52, in this case a circular hole of diameter "b", and emerges in the far (hidden) side of the partition member 42. A corresponding impingement hole entry apertures 54 is formed for each hole in the partition rear side of the member 42. These impingement hole entry apertures 54 are non-circular, in the drawing they are generally oval, they may be elliptical or simply a short length of channel similar to that used in the first described embodiment. As before the width or minor dimension "a" of the impingement hole entry aperture is important and is always less than or at most equal to the dimension of air delivery impingement hole 48. The major dimensions "e" is less critical but again should be determined by the amount of blockage by trapped particles that may be tolerated. Up to the predetermined level of acceptable blockage sufficient of the area of the impingement hole entry aperture 54 shall remain open to avoid choking of the air delivery impingement hole 48. Typically the total array of air passages or air delivery impingement holes 48 is arranged to perform a metering function in an internal air system, at least as far as the downstream portions of the air system are concerned. Preferably this metering function shall continue uncompromised at levels of blocking less than the predetermined maximum blockage threshold; the present invention is designed to achieve this in all its embodiments. Thus, on the basis the impingement hole entry aperture 54 may be considered rectangular and the impingement hole exit aperture 52 circular, for each hole:

$$a.e \geq k.n.\pi(^b/_2)^2$$

where k is some constant.

Various modifications of the features of the hole design are possible without departing from the spirit and concept of the invention. For example the second embodiment is illustrated as possessing an almost funnel-shaped configuration where the impingement hole entry aperture 54 is transformed into the impingement hole by roughly half hole depth. This transformation could be more progressive and occupy the whole depth of the hole. The impingement hole exit aperture 52 is not necessary circular. Preferably, however, the impingement hole entry aperture 54 is undercut having its narrowest dimension at the entry surface to best obtain the particle screening function, although a constant width hole shape could be adopted.

The invention thus enables gas turbine engines to be used in dusty, sandy conditions with an appreciably reduced risk of film cooling holes in vanes being blocked.

The principle of the invention may be applied to other parts of the engine where cooling holes may be at risk from blockage.

What is claimed is:

1. A gas turbine engine airfoil having an internal air system including air delivery impingement holes having a certain predetermined width, wherein, in use, the air system may carry particles of sufficiently large size to block the air delivery impingement holes, the airfoil including a partition member having an inlet area through which the internal air passes via at least one of said air delivery impingement holes comprised of an impingement hole exit aperture of said predetermined width in the downstream surface of the partition member, and a non-circular impingement hole entry aperture formed in the upstream surface of the partition member which has a minor dimension less than or equal to the impingement hole exit aperture width whereby to exclude particles of greater size and a substantially larger major dimension such that the passage of air into the air delivery impingement hole is largely unaffected by particles which becomes trapped in the impingement hole entry aperture.

2. A gas turbine engine airfoil as claimed in claim 1 wherein each air delivery impingement hole is supplied through an individual non-circular impingement hole entry aperture having major and minor dimensions.

3. A gas turbine engine airfoil as claimed in claim 1 wherein each air delivery impingement hole is supplied from a base of a channel formed in the upstream side of the partition member and the dimension constituting the width of the channel is less than the width of the air delivery impingement hole.

4. A gas turbine engine airfoil as claimed in claim 3 wherein the depth of the channel is greater than its width.

5. A gas turbine engine airfoil as claimed in claim 3 wherein the inlet area of the channel is greater than the total cross-section area of those air delivery impingement holes supplied by the channel.

6. A gas turbine engine airfoil as claimed in claim 3 wherein the partition member has the plurality of air delivery impingement holes formed in the base of the channel.

7. A gas turbine engine airfoil as claimed in claim 3 wherein the partition member passes a branch flow of the total internal air flow.

8. A gas turbine engine airfoil as claimed in claim 3 wherein the partition member is removable from the airfoil.

9. A gas turbine engine airfoil as claimed in claim 8 wherein it is arranged for the movable partition member to be slidingly fit into the interior of the airfoil.

10. A gas turbine engine airfoil as claimed in claim 3 wherein the partition member divides an internal volume of the airfoil into an upstream region of high pressure and a downstream region of relatively lower pressure and the channel is formed in the high pressure side of the partition member.

11. A gas turbine engine airfoil as claimed in claim 4 wherein the partition member has the plurality of air delivery impingement holes formed in the base of the channel.

12. A gas turbine engine airfoil as claimed in claim 5 wherein the partition member has the plurality of air delivery impingement holes formed in the base of the channel.

* * * * *